Patented June 10, 1924.

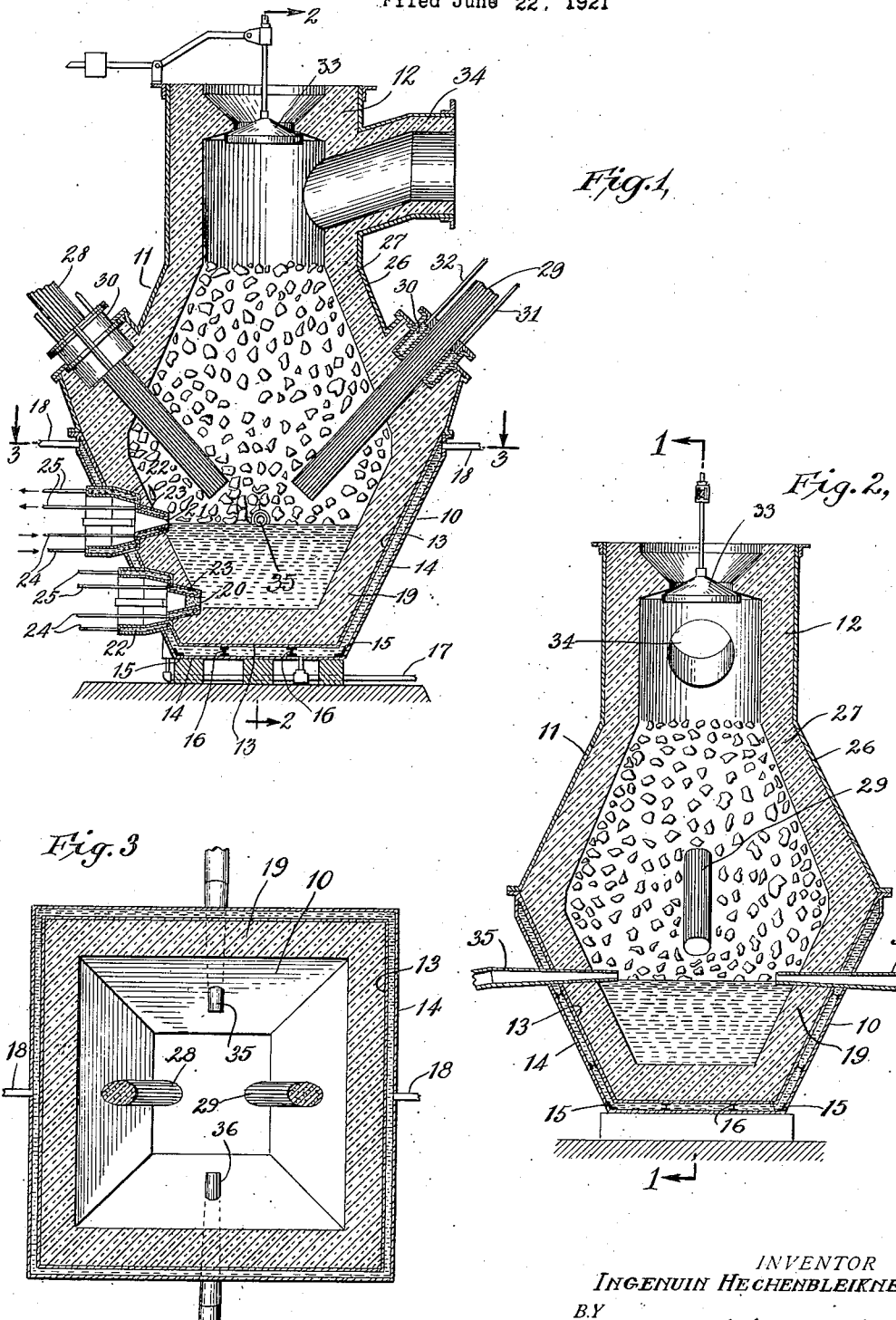

1,497,173

UNITED STATES PATENT OFFICE.

INGENUIN HECHENBLEIKNER, OF CHARLOTTE, NORTH CAROLINA, ASSIGNOR TO SOUTHERN ELECTRO-CHEMICAL COMPANY, OF NEW YORK, N. Y., A CORPORATION OF NEW JERSEY.

PROCESS OF AND APPARATUS FOR OXIDIZING GASES.

Application filed June 22, 1921. Serial No. 479,570.

*To all whom it may concern:*

Be it known that I, INGENUIN HECHENBLEIKNER, a citizen of the United States, and resident of Charlotte, in the county of Mecklenburg and State of North Carolina, have invented certain new and useful Improvements in Processes of and Apparatus for Oxidizing Gases, of which the following is a specification.

This invention relates to a method of and apparatus for oxidizing gases and relates more particularly to an electric furnace used in the manufacture of phosphoric acid for the production of phosphoric anhydrid; and has special reference to the provision of such a furnace having means for and embodying a method of oxidizing in the furnace the phosphorous gas produced therein for the obtaining of the phosphoric anhydrid.

In the manufacture of phosphoric acid a charge comprising a mixture of phosphatic material such as phosphate rock, carbonaceous material such as coke or carbon and silicious material such as sand, is fed into an electric furnace provided with the usual carbon electrodes to which an alternating current is supplied for the production of an electric arc. The intense heat of the arc causes the components of the mixture to melt down and interreact, phosphorous gas being generated or liberated in the zone of reaction according to the following formula:

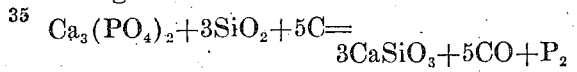
$$Ca_3(PO_4)_2 + 3SiO_2 + 5C = 3CaSiO_3 + 5CO + P_2$$

The phosphorous gas as also the carbon monoxide produced is free to be drawn from the furnace, this being usually accomplished by means of the suction or draft created by an exhaust blower or fan forming part of the phosphoric acid producing system, the calcium silicate produced remaining in the furnace and forming a slag which is drawn off from time to time. The phosphorous vapors or gas liberated in the furnace is then thoroughly comixed with an oxidizing fluid, preferably air, the phosphorous combining with the oxygen in the air to produce phosphoric anhydrid or phosphorous pentoxide according to the formula:

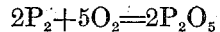
$$2P_2 + 5O_2 = 2P_2O_5$$

The carbon monoxide produced in the furnace is also burned to carbon dioxide according to the formula:

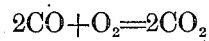
$$2CO + O_2 = 2CO_2$$

The $P_2O_5$ gases formed by the intermixture of the $P_2$ vapors with air may then be conducted through absorption towers where the $P_2O_5$ gases are absorbed by water to produce phosphoric acid.

By a prior process, as described, for example, in my Patent No. 1,249,392, patented December 11, 1917, the $P_2$ gases liberated in the furnace is comixed with a stream of air in an oxidizing chamber separated from but connected to the furnace, means being provided in the separate oxidizing chamber for effecting a thorough intermixture of the phosphorous vapors with the air to produce a maximum $P_2O_5$ yield. Another prior process contemplates the introduction of the oxidizing fluid such as air through inlets provided in the upper walls of the furnace. The introduction of the air at such point in this latter process, however, has been found disadvantageous for the reason that an efficient comixture of the air and $P_2$ gases cannot be obtained.

I have found that an efficient oxidizing of the $P_2$ gases may be produced by introducing a jet or stream of oxidizing fluid such as air into the furnace in the region of phosphorous liberation, and more particularly in the reaction zone of the furnace. I have found that by introducing a stream or current of air in the reaction zone, and more specifically between and below the electrodes at or about the slag level of the furnace, that the oxygen in the air will effectively comix and combine with the $P_2$ gases liberated in this zone and that these elements will react for the formation of the $P_2O_5$ gases without materially affecting the integrity of the carbon electrodes. The affinity of the oxygen for the liberated $P_2$ gases in the hot zone of reaction appears to be such as to cause these elements to comix and combine without subjecting the furnace electrodes to attack. The introduction of the air in this zone of reaction in addition to effecting oxidation of the $P_2$ gases also causes the oxidation of the CO gases to $CO_2$. By introducing the air into the furnace at the zone of reaction I am enabled to obtain not only an efficient comixture of the gases and a high yield of phosphoric anhydrid, but I am enabled to entirely dispense with the construction and use of a separate oxidizing and mixing chamber. Furthermore, since the production of $P_2O_5$ and $CO_2$ from the $P_2$ and CO gases involve exothermic reactions, an evolution of the heat takes place in the reaction zone, rendering a more intense heat zone, this permitting alternatively, where local overheating is desired to be avoided, the use of less energy consumption in the electric arc. Furthermore, the greater heat evolved in the reaction zone may be utilized for the better preheating of the charge in the furnace above the reaction zone. My present invention therefore contemplates a method and means for accomplishing these results and involves generally the introducing of a jet or stream of oxidizing fluid into the furnace in the reaction zone thereof so as to effect the desired oxidation of the gases generated or liberated in the furnace.

To the accomplishment of the foregoing and such other objects as may hereinafter appear, my invention consists in the elements and their relation one to the other, as hereinafter particularly described and sought to be defined in the claims, reference being had to the accompanying drawings, which show a preferred embodiment of my invention and in which:

Figure 1 is an elevational view in cross section of my furnace taken on the line 1—1, Figure 2, Figure 2 is an elevational view in cross section taken on the line 2—2, Figure 1, and Figure 3 is a plan view in cross section taken on the line 3—3, Figure 1.

The furnace preferably comprises a bottom section 10 forming a reaction chamber, an intermediate section 11 forming a chamber for receiving a charge of phosphatic, carbonaceous and silicious material, and a top section 12 forming a stack and conduit communication with section 11 of the furnace and adapted to be connected to other apparatus used in the manufacture of phosphoric acid, as shown, for example, in my Patent No. 1,112,211, dated September 29, 1914.

The bottom section 10 of the furnace is preferably surrounded by a water jacket formed by spaced sheet metal plates 13 and 14, reinforced preferably by angle irons 15 and I beams 16, the spaced plates defining a chamber for the reception of a refrigerating fluid such as water, piping 17 being provided and connected to a bottom plate 14 for conducting the water to the water jacket, outlet pipe sections 18 communicating with the upper part of the water jacket being provided for conducting the circulating water out of the water jacket. The water jacket is preferably lined with a fire resisting material such as fire brick 19, this forming the walls of the reaction chamber of the furnace. The bottom furnace section 10 is also provided preferably with a plurality of tap holes 20 and 21 respectively, the tap holes 20 and 21 being preferably surrounded by water jackets. Each of the water jackets preferably comprises telescoping tapered sections 22 and 23, both imbedded in the fire brick wall 19 in the bottom furnace section 10, the jackets 22 and 23 being preferably formed of sheet metal and each being provided with an inlet pipe 24 and an outlet pipe 25.

The intermediate section 11 of the furnace is adapted for the reception of a charge of phosphate rock, sand and carbon, the said intermediate section comprising a sheet metal exterior 26 internally lined with a fire resisting wall such as a fire brick wall 27, this intermediate portion 11 receiving the adjustable electrodes 28 and 29, each of the electrodes being surrounded with a cooling system in the form of a water jacket 30, inlet pipe section 31 and outlet pipe section 32 being conected to the jacket 30 for conducting a circulating refrigerating medium into and from the said cooling system.

The top or stack portion 12 of the furnace may form a continuation of the intermediate section and is also preferably provided with the sheet metal exterior internally lined with fire resisting material, the said stack portion 12 being provided with a feed opening in the form of a bell hopper 33, the mixture of phosphate rock, sand and carbon being introduced into the furnace through this bell hopper. The stack portion 12 is also formed with a conduit section 34, the gases generated or liberated in the furnace being adapted to be drawn from the furnace by way of this conduit and through other apparatus connected to the conduit, a suction or draft to create a velocity for the moving gases being provided by an exhaust fan forming part of the system as particularly shown in the patent above referred to.

The charge introduced through the bell hopper 33 is received in section 11 of the furnace, the said charge being then adapted to be melted down by the heat of the arc across the electrodes 28 and 29, the high temperature of the arc causing the components of the mixture or charge to interreact for the liberation of phosphorous and carbon monoxide gases as hereinabove referred to, the calcium silicate forming a slag which is removed from the tap hole 21, the gases liberated in the zone of reaction surrounding the electrodes being free to be drawn upwardly through the stack and through the auxiliary apparatus connected to the furnace.

I have found that by introducing a jet or stream of air, preferably under prssure, into the furnace and more particularly into the reaction zone thereof, that the phosphorous gases liberated in this zone may be made to efficiently react and combine with the oxygen in the air to form the desired phosphorous anhydrid. To this end the bottom section 10 of the furnace is provided with means for directing a jet or current of air into the reaction zone of the furnace. I accordingly provide the furnace with preferably opposing air nozzles 35 and 36, each of the nozzles opening into the furnace, the nozzles being so imbedded and located in the furnace walls as to direct a stream of oxidizable fluid such as air into the charge at the slag level or slightly above the slag level of the furnace. I have found that by injecting the air by this means and in this manner into the furnace and into the reaction zone thereof that the phosphorous pentoxide gases may be efficiently produced in this region, the affinity of the oxygen for the liberated phosphorous vapors in this heated zone being such as to effect the combination of these gases without subjecting the carbon electrodes to destruction and without affecting the fire brick walls of the furnace. I have further found that by the generation of the phosphorous pentoxide gases in this region, as also the carbon dioxide gases, that a more intense heat is obtained in the reaction zone due to the heat of oxidation, this in turn effecting a more efficient reaction and permitting a less consumption of energy for the electric arc. Furthermore, the generation of more intense heat in this zone permits of a better preheating of the charge or mixture in the intermediate furnace section 11 by the $P_2O_5$ and the $CO_2$ gases which move through this section when drawn through the stack and conduit of the furnace.

For the purpose of concentrating the action of the air on the $P_2$ gases in the zone of reaction and for limiting the reaction zone, I preferably taper the walls of the section 10 of the furnace, the said walls being formed with downwardly converging sides, as particularly shown in the drawings, this yielding the desired limited zonal area where the liberation of phosphorous and the formation of the phosphorous pentoxide gases are produced. I also preferably taper or converge upwardly the walls of the intermediate furnace section 11, a more uniform preheating of the charge contained in this section being produced in this manner.

The operation and method of use of my furnace will, in the main, be apparent from the above description thereof. The charge of phosphate rock, sand and carbon is introduced into the furnace by way of the hopper 33, an alternating current impressed upon the carbon electrodes of the furnace providing the desired arc and high temperature for melting down the charge and causing the same to react for the liberation of the phosphorous gas, a jet of air, preferably under pressure, being introduced or injected into the furnace and more particularly into the reaction zone thereof, nozzle sections 35 and 36 being provided for directing the jet of air into the said reaction zone. The phosphorous gas liberated in this highly heated zone will be oxidized by the air for the production of phosphoric anhydrid, a suction or draft created in the conduit 34 effecting the desired velocity for removing the produced phosphorous pentoxide gases from the furnace and into the auxiliary apparatus connected to the furnace where the said phosphorous pentoxide gases are absorbed by water to produce phosphoric acid. By introducing the jet of air in sufficient volume and preferably under pressure in the reaction zone of the furnace, not only will an efficient comixture of oxygen and phosphorous take place for the generation of phosphorous pentoxide, but a more intense heat will be produced in the reaction zone due to the heat of oxidation, the oxidation of $P_2$ gases as well as the CO gases involving exothermic reactions. The introduction of air streams or currents in this manner into the furnace permits of the dispensing of an oxidizing chamber hitherto employed, a saving of energy in the electric arc being also permitted along with a more efficient preheating of the charge or mixture received by the furnace.

While I have shown and described my device in the preferred form, it will be obvious that many changes and modifications may be made in the structure disclosed without departing from the spirit of the invention, defined in the following claims.

I claim:

1. The process of producing gases for use in the arts which consists in heating a charge to effect a reaction for the production of a vapor or gas and in completely oxidizing the gas at the zone of reaction by subjecting the charge within the zone of reaction to a current of oxidizing fluid.

2. The process of producing phosphoric acid gases which consists in heating a charge by means of the electric arc to effect a reaction for the production of phosphorous vapor or gas and in subjecting the charge within the zone of reaction to a current of oxidizing fluid to oxidize the gas produced.

3. The process of producing phosphorous gases which consists in heating a charge to effect a reaction for the production of phosphorous vapor or gas and in completely oxidizing the gas produced by injecting a current of air into the zone of reaction.

4. The process of oxidizing gases which consists in heating a charge of carbonaceous, phosphatic and silicious material to effect a reaction for the production of phosphorous vapor or gas and in completely oxidizing the gas produced by subjecting the charge within the zone of reaction to a current of oxidizing fluid such as air.

5. The process of oxidizing gases which consists in heating a charge of carbonaceous, phosphatic and silicious material by means of the electric arc to effect a reaction for the production of phosphorous vapor or gas and in subjecting the charge within the zone of reaction to a current of oxidizing fluid such as air to oxidize the gas to phosphoric anhydrid.

6. In the process of producing phosphoric acid gas by subjecting a charge to heat to cause the same to react for the liberation of a phosphorous gas or vapor, the step which consists in completely oxidizing the gas by introducing an oxidizing fluid within the zone of reaction.

7. In the process of producing phosphorous vapor or gas by subjecting a charge of carbonaceous, phosphatic and silicious material to an electric arc to cause the same to react for the liberation of phosphorous vapor or gas, the step which consists in injecting a current of oxidizing fluid within the zone of reaction to oxidize the phosphorous gas produced.

8. The process of producing phosphoric acid gases which consists in subjecting a charge to the arc in an electric furnace to effect a reaction for the liberation of a phosphorous vapor or gas, in introducing substantially at the slag level in the furnace a current of oxidizing fluid to oxidize the gas produced.

9. The process of oxidizing gases which consists in subjecting a charge of carbonaceous, phosphatic and silicious material to the arc in an electric furnace to effect a reaction for the liberation of a phosphorous vapor or gas and in introducing substantially at the slag level in the furnace a current of air to oxidize the gas produced.

10. In the process of producing a phosphorous vapor or gas by subjecting a charge of carbonaceous, phosphatic and silicious material to the arc in an electric furnace to cause the charge to react for the liberation of phosphorous gas or vapor, that step which consists in introducing a jet or current of air substantially at the slag level in the furnace to oxidize the phosphorous gas to produce phosphoric anhydrid.

Signed at Charlotte in the county of Mecklenburg and State of North Carolina this 6 day of June A. D. 1921.

INGENUIN HECHENBLEIKNER.